United States Patent
Komatsu et al.

(10) Patent No.: US 12,556,811 B2
(45) Date of Patent: Feb. 17, 2026

(54) ACCURACY ESTIMATION APPARATUS, IMAGE CAPTURING APPARATUS, ACCURACY ESTIMATION METHOD, CONTROL METHOD, AND STORAGE MEDIUM THAT PROVIDE A NOTIFICATION BASED ON AN ACCURACY

(71) Applicant: CANON KABUSHIKI KAISHA, Tokyo (JP)

(72) Inventors: Satoru Komatsu, Cambridge, MA (US); Yosuke Eguchi, Tokyo (JP); Takuya Ishibashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/425,110

(22) Filed: Jan. 29, 2024

(65) Prior Publication Data

US 2024/0171855 A1    May 23, 2024

Related U.S. Application Data

(63) Continuation of application No. 17/882,770, filed on Aug. 8, 2022, now Pat. No. 11,924,542.

(30) Foreign Application Priority Data

Aug. 30, 2021   (JP) ................... 2021-140265

(51) Int. Cl.
*H04N 23/60* (2023.01)
*H04N 23/63* (2023.01)
(Continued)

(52) U.S. Cl.
CPC .......... *H04N 23/64* (2023.01); *H04N 23/635* (2023.01); *H04N 23/667* (2023.01); *H04N 23/80* (2023.01)

(58) Field of Classification Search
CPC .... H04N 23/64; H04N 23/635; H04N 23/667; H04N 23/80; H04N 23/634;
(Continued)

(56) References Cited

U.S. PATENT DOCUMENTS

| 10,070,038 B2 | 9/2018 | Komatsu |
| 2011/0292183 A1* | 12/2011 | Tajiri ................... H04N 13/189 348/E13.074 |
| 2016/0105660 A1* | 4/2016 | Ito ........................ H04N 13/282 348/46 |

FOREIGN PATENT DOCUMENTS

| JP | 6091228 B | 3/2017 |
| JP | 2018-180187 A | 11/2018 |

(Continued)

OTHER PUBLICATIONS

Notice of Reasons for Refusal issued Jun. 6, 2025, in corresponding Japanese Patent Application No. 2021-140265 (10 pages).

(Continued)

*Primary Examiner* — Ahmed A Berhan
(74) *Attorney, Agent, or Firm* — Venable LLP

(57) ABSTRACT

An accuracy estimation apparatus includes at least one processor and/or at least one circuit that functions as an obtainment unit configured to obtain a shooting condition for a plurality of parallax images that mutually exhibit parallax, and an estimation unit configured based on the shooting condition, to estimate an accuracy of dimension measurement that is performed using the plurality of parallax images.

8 Claims, 7 Drawing Sheets

(51) Int. Cl.
*H04N 23/667* (2023.01)
*H04N 23/67* (2023.01)
*H04N 23/80* (2023.01)

(58) Field of Classification Search
CPC .... H04N 23/672; H04N 23/673; H04N 23/69; H04N 23/72; H04N 23/81
See application file for complete search history.

(56) References Cited

FOREIGN PATENT DOCUMENTS

| | | |
|---|---|---|
| JP | 2020-174331 A | 10/2020 |
| JP | 2021-048560 A | 3/2021 |
| WO | 2012-001982 A | 1/2012 |

OTHER PUBLICATIONS

Decision of Refusal issued Aug. 15, 2025, in corresponding Japanese Patent Application No. 2021-140265 (6 pages).

\* cited by examiner

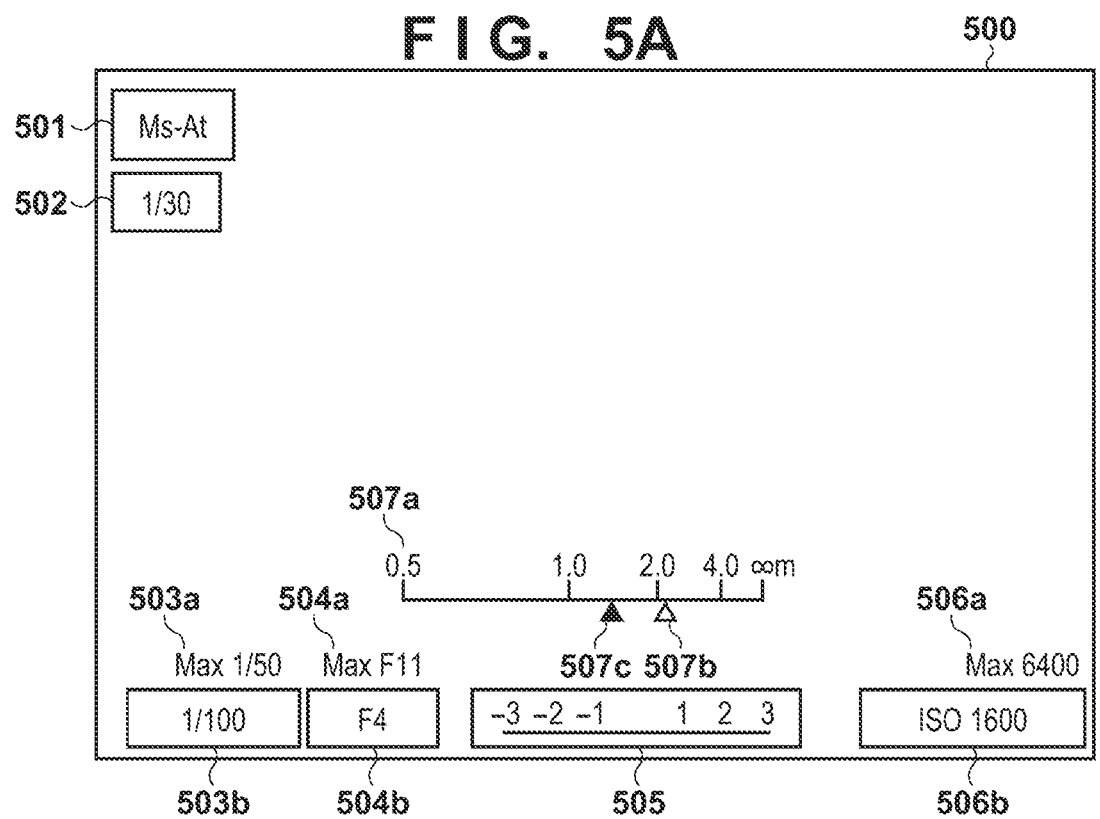
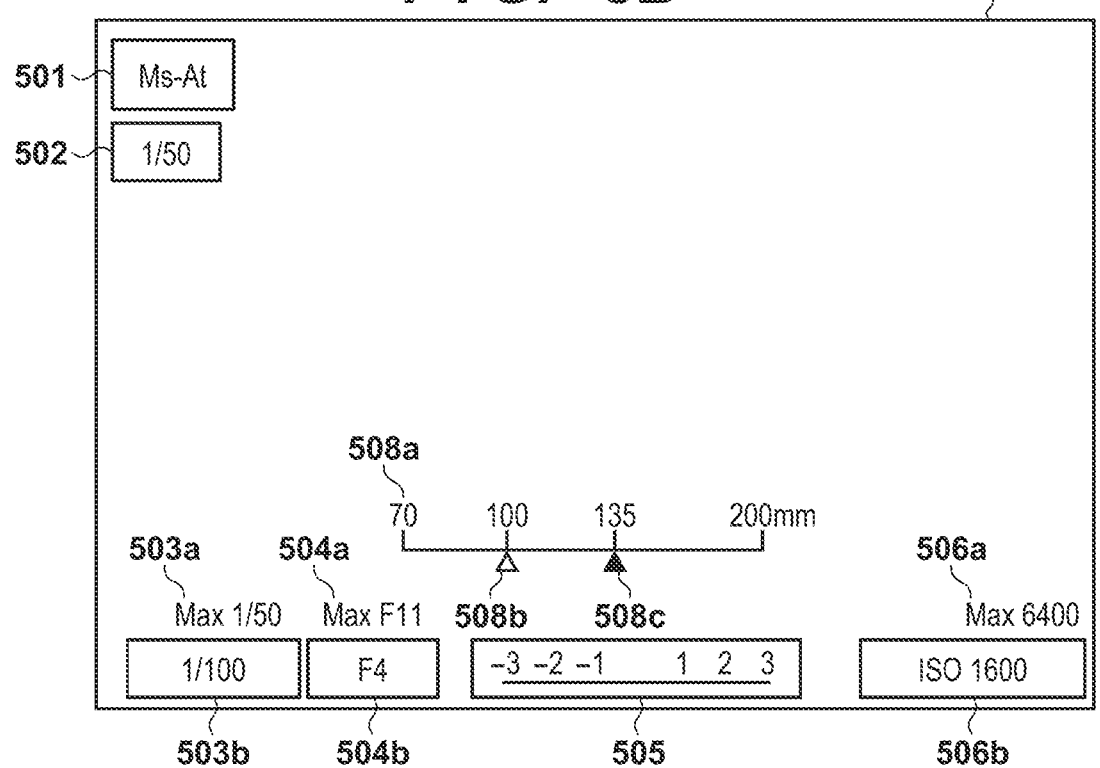

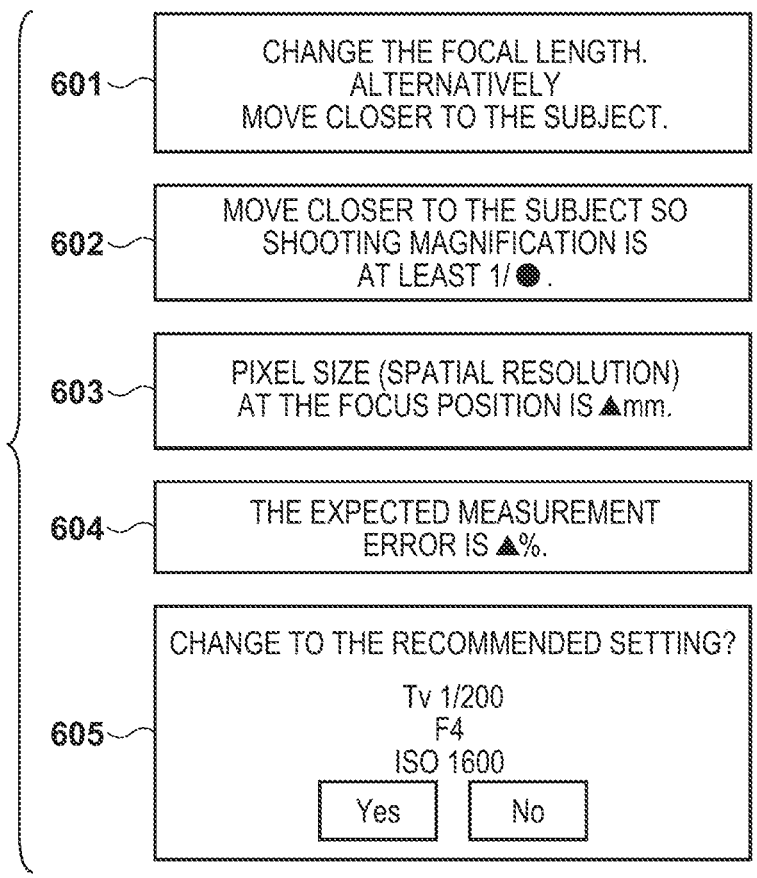
FIG. 6A
FIG. 6B
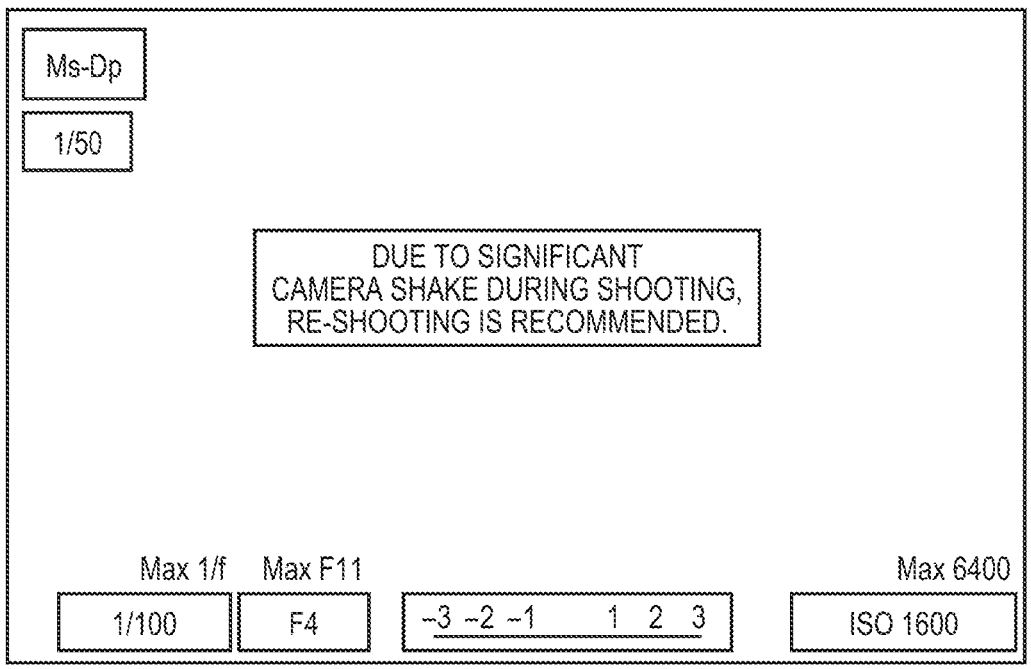

ACCURACY ESTIMATION APPARATUS, IMAGE CAPTURING APPARATUS, ACCURACY ESTIMATION METHOD, CONTROL METHOD, AND STORAGE MEDIUM THAT PROVIDE A NOTIFICATION BASED ON AN ACCURACY

CROSS REFERENCE TO PRIOR APPLICATIONS

This application is a continuation of U.S. patent application Ser. No. 17/882,770, filed Aug. 8, 2022, now U.S. Pat. No. 11,924,542, issued Mar. 5, 2024, which claims the benefit of Japanese Patent Application No. 2021-140265, filed Aug. 30, 2021, each of which is hereby incorporated by reference herein in its entirety.

BACKGROUND OF THE INVENTION

Field of the Invention

The present invention relates to an accuracy estimation apparatus, an image capturing apparatus, an accuracy estimation method, a control method, and a storage medium.

Description of the Related Art

There are techniques to obtain distance information from a shot image or the state of an image capturing apparatus at the time of shooting, and to calculate dimension information of a subject. Japanese Patent No. 6091228 suggests a method that designates a desired distance measurement range in executing distance measurement based on a plurality of images that have been shot under different shooting conditions, thereby, deciding on a shooting condition that enables optimal distance measurement within the designated distance measurement range.

Japanese Patent No. 6091228 pertains to the execution of distance measurement based on a plurality of images that have been shot under different shooting conditions, and does not pertain to dimension measurement that is executed using a plurality of parallax images that have been shot under a specific shooting condition and that mutually exhibit parallax.

SUMMARY OF THE INVENTION

The present invention has been made in view of the above situation, and provides a technique to estimate the accuracy of dimension measurement that is executed using a plurality of parallax images that have been shot under a specific shooting condition and that mutually exhibit parallax.

According to a first aspect, the present invention provides an accuracy estimation apparatus comprising at least one processor and/or at least one circuit that functions as an obtainment unit configured to obtain a shooting condition for a plurality of parallax images that mutually exhibit parallax, and an estimation unit configured, based on the shooting condition, to estimate an accuracy of dimension measurement that is performed using the plurality of parallax images.

According to a second aspect, the present invention provides an image capturing apparatus comprising at least one processor and/or at least one circuit that functions as a shooting unit configured to shoot a plurality of parallax images that mutually exhibit parallax, an estimation unit configured to, before the shooting of the plurality of parallax images, estimate an accuracy of dimension measurement that is performed using the plurality of parallax images based on a shooting condition for the plurality of parallax images, and a notification unit configured, before the shooting of the plurality of parallax images, to provide a notification based on the estimated accuracy.

According to a third aspect, the present invention provides an accuracy estimation method executed by an accuracy estimation apparatus, the method comprising obtaining a shooting condition for a plurality of parallax images that mutually exhibit parallax, and, based on the shooting condition, estimating an accuracy of dimension measurement that is performed using the plurality of parallax images.

According to a fourth aspect, the present invention provides a control method for controlling an image capturing apparatus, comprising: shooting a plurality of parallax images that mutually exhibit parallax; before the shooting of the plurality of parallax images, estimating an accuracy of dimension measurement that is performed using the plurality of parallax images based on a shooting condition for the plurality of parallax images, and, before the shooting of the plurality of parallax images, providing a notification based on the estimated accuracy.

According to a fifth aspect, the present invention provides a non-transitory computer-readable storage medium that stores a program for causing a computer to execute an accuracy estimation method comprising obtaining a shooting condition for a plurality of parallax images that mutually exhibit parallax, and, based on the shooting condition, estimating an accuracy of dimension measurement that is performed using the plurality of parallax images.

According to a sixth aspect the present invention provides a non-transitory computer-readable storage medium that stores a program for causing a computer to execute a control method comprising shooting a plurality of parallax images that mutually exhibit parallax, before the shooting of the plurality of parallax images, estimating an accuracy of dimension measurement that is performed using the plurality of parallax images based on a shooting condition for the plurality of parallax images, and before the shooting of the plurality of parallax images, providing a notification based on the estimated accuracy.

Further features of the present invention will become apparent from the following description of exemplary embodiments with reference to the attached drawings.

BRIEF DESCRIPTION OF THE DRAWINGS

FIGS. 5A and 5B are diagrams showing user interfaces according to a first embodiment.

FIG. 6A is a diagram showing examples of a warning display related to the accuracy of dimension measurement.

FIG. 6B is a diagram showing one example of a notification in step S413 of FIG. 4.

DESCRIPTION OF THE EMBODIMENTS

Figure 1:
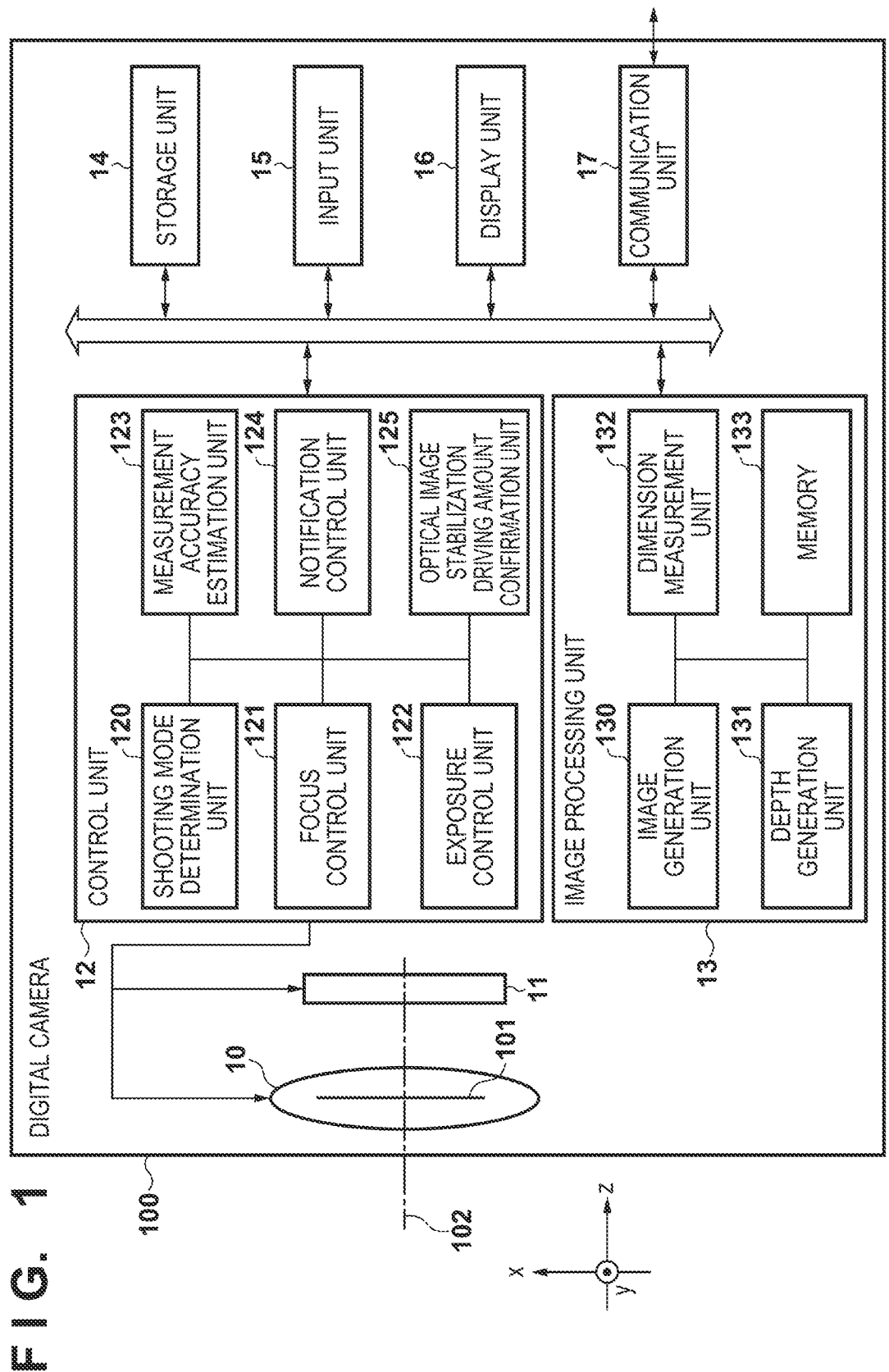
FIG. 1 is a block diagram showing a functional configuration of a digital camera 100.

Hereafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and a redundant description thereof is omitted.

In each of the following embodiments, a digital camera (image capturing apparatus) capable of obtaining depth information related to the distribution of distances of a subject is used as an accuracy estimation apparatus that estimates the accuracy of dimension measurement. It is also possible to apply the accuracy estimation apparatus to a digital camera that outputs distances of one point or a plurality of points to a focused subject as depth information. Furthermore, the configuration of each of the following embodiments is applicable to any device capable of calculating a dimension of a subject based on a captured image and depth information corresponding to the captured image. The depth information is information of the depth direction of the captured image, and a depth image or a depth map is information indicating the distribution of depths. It is possible to use an image displacement amount map calculated from a plurality of viewpoint images with different viewpoints (a plurality of parallax images that mutually exhibit parallax), a defocus amount map calculated by multiplying an image displacement amount by a predetermined conversion coefficient, a distance map obtained by converting a defocus amount into distance information of a subject, or the like, as the depth information.

First Embodiment

FIG. 1 is a block diagram showing a functional configuration of a digital camera 100. An image capturing optical system 10 is composed of a lens unit included in the digital camera 100 or a lens apparatus attachable to a main body portion of the camera, and forms an optical image of a subject onto an image sensor 11. The image capturing optical system 10 includes a plurality of lenses, not shown, aligned on an optical axis 102, and has an exit pupil 101 located at a position that is distanced from the image sensor 11 by a predetermined distance. Note that, in the present specification, the direction parallel to the optical axis 102 is defined as a z direction (depth direction). That is to say, the depth direction is a direction in which a subject exists, provided that the position of the digital camera 100 is the base. Also, the direction that is perpendicular to the optical axis 102 and parallel to the horizontal direction of the image sensor 11 is defined as an x direction, and the direction that is perpendicular to the optical axis 102 and parallel to the vertical direction of the image sensor 11 is defined as a y direction.

The image sensor 11 is, for example, an image sensor of a CCD (charge-coupled device) type, or an image sensor of a CMOS (complementary metal-oxide semiconductor) type. The image sensor 11 performs photoelectric conversion with respect to a subject image that has been formed on an image capturing plane via the image capturing optical system 10, and outputs image signals related to the subject image. As will be described later, the image sensor 11 of the present embodiment has a ranging function of an image capturing plane phase detection method, and is capable of generating and outputting distance information indicating a distance from the front focal position of the digital camera 100 to a focused subject (a subject distance), in addition to a captured image.

A control unit 12 includes a central processing unit (CPU) or a microprocessor, a memory that stores a control processing program, and the like, and controls the operations of each constituent element included in the digital camera 100. In the present embodiment, the control unit 12 includes a shooting mode determination unit 120, a focus control unit 121, an exposure control unit 122, a measurement accuracy estimation unit 123, a notification control unit 124, and an optical image stabilization driving amount confirmation unit 125. Optical image stabilization is also referred to as an OIS (Optical Image Stabilizer). Also, the control unit 12 controls an image processing unit 13, a storage unit 14, an input unit 15, a display unit 16, and a communication unit 17.

The shooting mode determination unit 120 determines whether the current shooting mode is a mode in which normal shooting is performed (a normal shooting mode), or a mode in which shooting that is intended to execute dimension measurement is performed (a measurement mode). In the case of the measurement mode, the shooting mode determination unit 120 further determines which one of a plurality of types of measurement modes is the current shooting mode, and executes processing for, for example, restricting a shooting condition in accordance with the determination result.

The focus control unit 121 performs focus control with respect to a desired subject, and calculates distance information indicating a distance to the subject based on position information of a focusing lens at the time of focus and on optical design information of the image capturing optical system 10.

The exposure control unit 122 calculates the optimal exposure condition in consideration of the shooting condition that has been fixed in accordance with the measurement mode, and sets such shooting parameters as the sensitivity, aperture value, and exposure period.

The measurement accuracy estimation unit 123 estimates an error that could possibly occur at the time of dimension measurement based on the focal length, subject distance, sensitivity, aperture value, and exposure period that have been set or calculated. Also, in a case when the estimated error exceeds a preset error range, the measurement accuracy estimation unit 123 calculates a shooting condition with which the error falls within the set range (a recommended shooting condition).

The notification control unit 124 notifies a photographer (user) of the estimated error of dimension measurement, the recommended shooting condition, maximum setting values of various types of shooting parameters, and the like, via the display unit 16.

The optical image stabilization driving amount confirmation unit 125 confirms the position of an optical image stabilization lens that was driven via optical image stabilization at the time of shooting, and estimates a field curvature amount corresponding to the position of the optical image stabilization lens. Then, the optical image stabilization driving amount confirmation unit 125 determines whether the amount of driving of the optical image stabilization lens has reached a driving amount with which the field curvature amount exceeds a predetermined amount.

The image processing unit 13 executes various types of image processing. The image processing unit 13 includes an image generation unit 130, a depth generation unit 131, and a dimension measurement unit 132. Also, the image processing unit 13 includes a memory 133 that is used as a working area for image processing. Note that the functions of the image processing unit 13 can be configured using a logic circuit, or can be configured using a CPU and a memory that stores a computational processing program.

The image generation unit 130 generates images to be viewed by performing various types of signal processing, such as noise removal, demosaicing, luminance signal conversion, aberration correction, white balance adjustment, and color correction with respect to image signals output from the image sensor 11. Captured image data output from the image generation unit 130 is temporarily stored into the memory 133.

The depth generation unit 131 generates a depth image indicating the distribution of depths based on signals obtained by ranging pixels included in the image sensor 11. In the depth image, the value indicated by each pixel indicates the distance of a subject that exists in a region of a captured image corresponding to that pixel.

The dimension measurement unit 132 measures the dimension between the positions (at least two points) that have been designated by the user on an image displayed on the display unit 16. The measured dimension may be one of a pixel-by-pixel dimension on the image, a dimension on the image plane that has been converted from a pixel size, and a dimension on the object side that has been converted based on the shooting magnification.

The storage unit 14, input unit 15, display unit 16, and communication unit 17 are all connected to a bus. The storage unit 14 includes a nonvolatile storage medium. For example, captured image data, intermediate data that has been generated in the course of processing of respective units in the digital camera 100, parameters that have been referred to during the operations of the image processing unit 13 and the digital camera 100, and the like, are stored in the storage unit 14. It is sufficient that the storage unit 14 guarantee the processing performance that is permitted in realizing processing. There is a case when a large-capacity storage medium that enables high-speed reading and writing is used; for example, a flash memory, or the like, is used.

The input unit 15 is a user interface unit provided with devices that detect an operational input of the user. For example, inputting of information to the digital camera 100, an operation of changing the settings thereon, and the like, are detected via a dial, a button, a switch, a touchscreen, and so on, and the input unit 15 outputs a signal corresponding to the operational input to the control unit 12.

The display unit 16 includes, for example, a display device such as a liquid crystal display and an organic EL (electro-luminescence). The display unit 16 is used in confirmation on the composition at the time of shooting by way of through-the-lens display of a captured image, display of various types of setting screens, notification of message information, and so on. Furthermore, the display unit 16 displays information output from the notification control unit 124 of the control unit 12. Moreover, in the case of an embodiment that uses a touchscreen, the display unit 16 can have both of the display function and the input function.

The communication unit 17 is a communication interface unit that exchanges information between the digital camera 100 and an external apparatus. The communication unit 17 is capable of transmitting, for example, the captured image data, depth information, dimension, coordinate information, and accuracy of dimension measurement that have been obtained to an external apparatus.

Figure 2A:
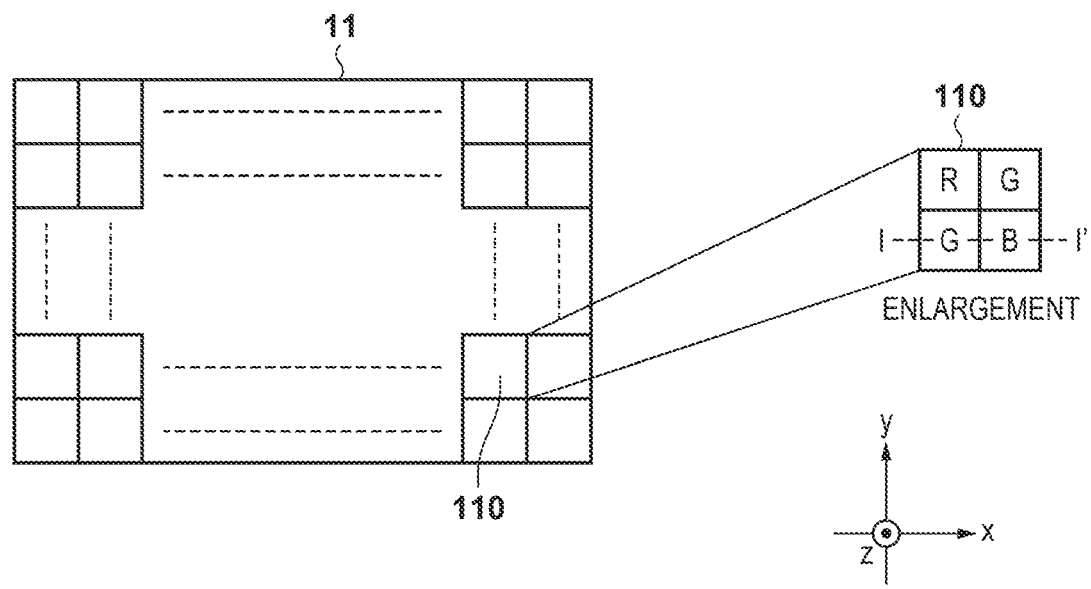
FIGS. 2A and 2B are diagrams showing the configuration of an image sensor 11.
Figure 2B:
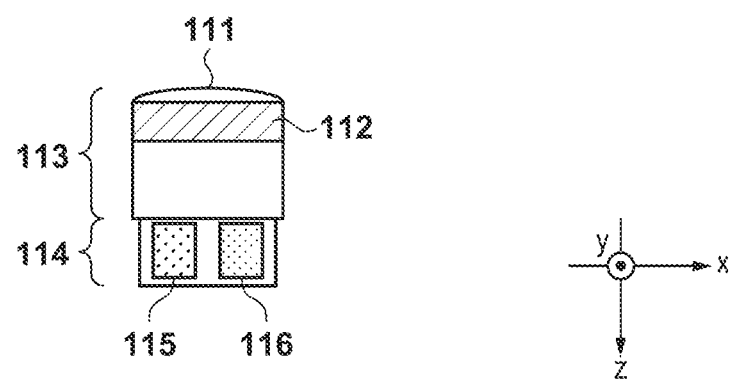

Next, the configuration of the image sensor 11 will be described with reference to FIGS. 2A and 2B. FIG. 2A is a schematic diagram showing the arrangement of a pixel group. It is assumed that the direction vertical to the paper surface of FIG. 2A is the z direction, and the two directions that are perpendicular to each other on the paper surface are the x direction and the y direction. FIG. 2B is a schematic diagram for describing a pixel configuration. It is assumed that the direction vertical to the paper surface of FIG. 2B is the y direction, and the two directions that are perpendicular to each other on the paper surface of FIG. 2B are the x direction and the z direction.

As shown in FIG. 2A, the image sensor 11 is composed of a pixel group in which a large number of pixel units 110 is arranged. One pixel unit 110 has a two row by two column configuration to which different color filters have been applied. As shown in the enlarged illustration, red (R), green (G), and blue (B) color filters are disposed, and photoelectric conversion elements that compose the pixel unit 110 output an image signal corresponding to color information of one of R, G, and B. Note that, although FIG. 2A shows an example in which color filters R, B, G, and G are disposed at the upper left, lower right, lower left, and upper right, respectively, the placement of color filters is not limited to this.

The image sensor 11 has a ranging function of the image capturing plane phase detection method. FIG. 2B shows a cross-sectional view of a unit pixel taken along the line I-I' of FIG. 2A. A unit pixel includes a light guiding layer 113 including a microlens 111 and a color filter 112, and a light receiving layer 114 including a first photoelectric conversion unit 115 and a second photoelectric conversion unit 116. In the light guiding layer 113, the microlens 111 efficiently guides incident light to the first photoelectric conversion unit 115 and the second photoelectric conversion unit 116. The color filter 112 allows light of a predetermined wavelength band to pass therethrough. The color filter 112 allows only light of a wavelength band corresponding to one of R, G, and B to pass therethrough, and guides the light to the first photoelectric conversion unit 115 and the second photoelectric conversion unit 116 in the succeeding stage.

The first photoelectric conversion unit 115 and the second photoelectric conversion unit 116 are provided in the light receiving layer 114, and each of these two photoelectric conversion units outputs an analog image signal by photoelectrically converting the received light. The two types of signals output from these two photoelectric conversion units are used in ranging. In ranging, an image signal composed of signals that have been output from the first photoelectric conversion units 115 among the two types of photoelectric conversion units aligned in a predetermined direction (horizontal direction) in the image sensor 11 is used as an A image signal, whereas an image signal composed of signals that have been output from the second photoelectric conversion units 116 thereamong is used as a B image signal. Depth information or distance information can be obtained from the phase difference between the A image signal and the B image signal. That is to say, each of the first photoelectric conversion unit 115 and the second photoelectric conversion unit 116 receives a portion of a light beam that is incident via the microlens 111. Therefore, the A image signal and the B image signal are signals of a pupil division image associated with a light beam that has passed through different partial pupil regions of the exit pupil 101 of the image capturing optical system 10. In each pixel unit, image signals obtained through photoelectric conversion performed by both of the first photoelectric conversion unit 115 and the second photoelectric conversion unit 116 (so-called added image signals) are used as a captured image. That is to say, a signal obtained by compositing the A image signal and the B image signal is equivalent to an image signal for viewing purpose output from photoelectric conversion units in a configuration in which a unit pixel includes only one photoelectric conversion unit.

The image sensor 11 of the present embodiment is capable of outputting an image signal for a viewing purpose, as well as an A image signal and a B image signal for a ranging purpose (a pupil division image). All of the pixel units that compose the image sensor 11 include a plurality of photoelectric conversion units, and are capable of obtaining high-density depth information. Note that, although FIG. 2B exemplarily shows the configuration in which two photoelectric conversion units are arranged in one pixel, no limitation is intended by this, and it is possible to adopt a configuration in which three or more photoelectric conversion units are provided in one pixel.

Figure 3A:
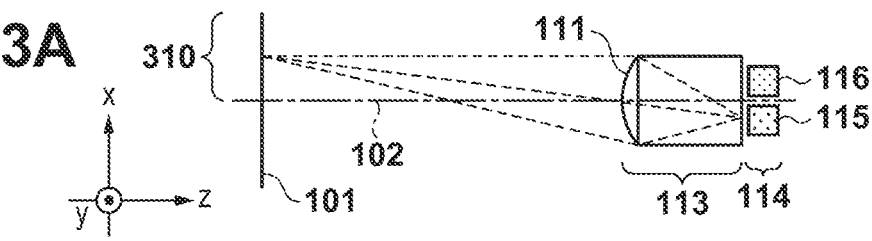
FIGS. 3A to 3E are diagrams for describing the principle of ranging of an image capturing plane phase detection method.
Figure 3B:
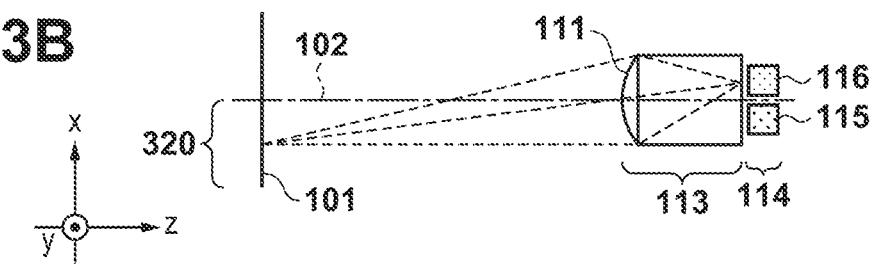

A description is now given of the principle of ranging of the image capturing plane phase detection method with reference to FIGS. 3A to 3E. A subject distance can be calculated based on respective outputs of the first photoelectric conversion units 115 and the second photoelectric conversion units 116 (a group of pupil division images). FIG. 3A is a schematic diagram showing the exit pupil 101 of the image capturing optical system 10 and a light beam received by the first photoelectric conversion unit 115. FIG. 3B is a schematic diagram showing the exit pupil 101 of the image capturing optical system 10 and a light beam received by the second photoelectric conversion unit 116. In FIG. 3A and FIG. 3B, it is assumed that the direction vertical to the paper surface is the y direction, and the two directions that are perpendicular to each other on the paper surface are the x direction and the z direction.

The microlens 111 shown in FIG. 3A and FIG. 3B is disposed so that the exit pupil 101 and the light receiving layer 114 are optically in a conjugate relationship. A light beam that has passed through the exit pupil 101 of the image capturing optical system 10 is collected by the microlens 111, and directed to the first photoelectric conversion unit 115 or the second photoelectric conversion unit 116. At this time, the first photoelectric conversion unit 115 and the second photoelectric conversion unit 116 mainly receive light that has passed through different partial pupil regions, respectively, as shown in FIG. 3A and FIG. 3B. The first photoelectric conversion unit 115 receives light that has passed through a first partial pupil region 310, and the second photoelectric conversion unit 116 receives light that has passed through a second partial pupil region 320.

The plurality of first photoelectric conversion units 115 provided in the image sensor 11 output first image signals corresponding to an A image signal. Also, the plurality of second photoelectric conversion units 116 provided in the image sensor 11 output second image signals corresponding to a B image signal. The intensity distribution of an image that is formed on the image sensor 11 by light that has passed through the first partial pupil region 310 can be obtained from the first image signals. Also, the intensity distribution of an image that is formed on the image sensor 11 by light that has passed through the second partial pupil region 320 can be obtained from the second image signals. The amount of relative positional displacement between the first image signals and the second image signals (a so-called parallax amount) has a value corresponding to a defocus amount. The relationship between a parallax amount and a defocus amount will be described with reference to FIG. 3C, FIG. 3D, and FIG. 3E.

Figure 3C:
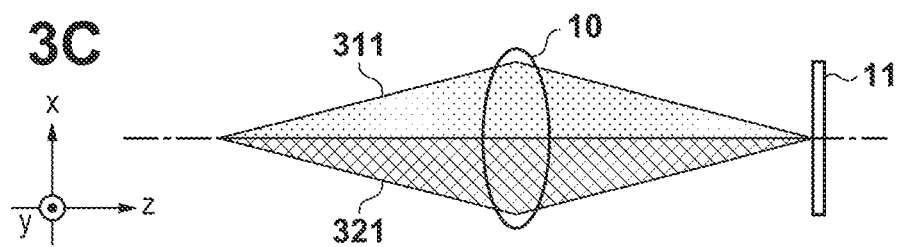
Figure 3D:
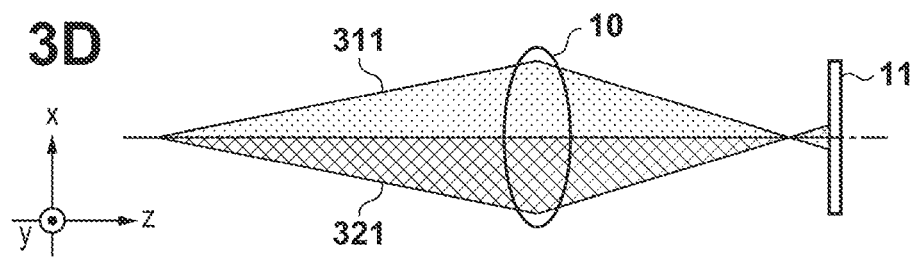
Figure 3E:
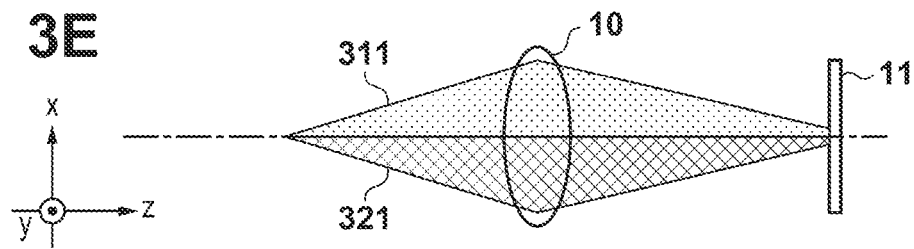

FIG. 3C, FIG. 3D, and FIG. 3E show a first light beam 311 that passes through the first partial pupil region 310, and a second light beam 321 that passes through the second partial pupil region 320. FIG. 3C shows an in-focus state in which the first light beam 311 and the second light beam 321 converge on a light receiving plane of the image sensor 11. At this time, the parallax amount between the first image signals and the second image signals is zero.

FIG. 3D shows a defocus state in which focus is on the image side in the negative direction (leftward direction) of the z axis (optical axis). The parallax amount between the first image signals and the second image signals has a negative value. FIG. 3E shows a defocus state in which focus is on the image side in the positive direction of the z axis. The parallax amount between the first image signals and the second image signals has a positive value. From a comparison between FIG. 3D and FIG. 3E, it is apparent that the direction of positional displacement is switched in accordance with whether the defocus amount has a negative value or a positive value. Also, it is apparent that the positional displacement occurs in accordance with the image forming relationship (geometric optical relationship) of the image capturing optical system depending on the defocus amount. The parallax amount equivalent to the positional displacement between the first image signals and the second image signals can be detected by a region-based matching method.

Figure 4:
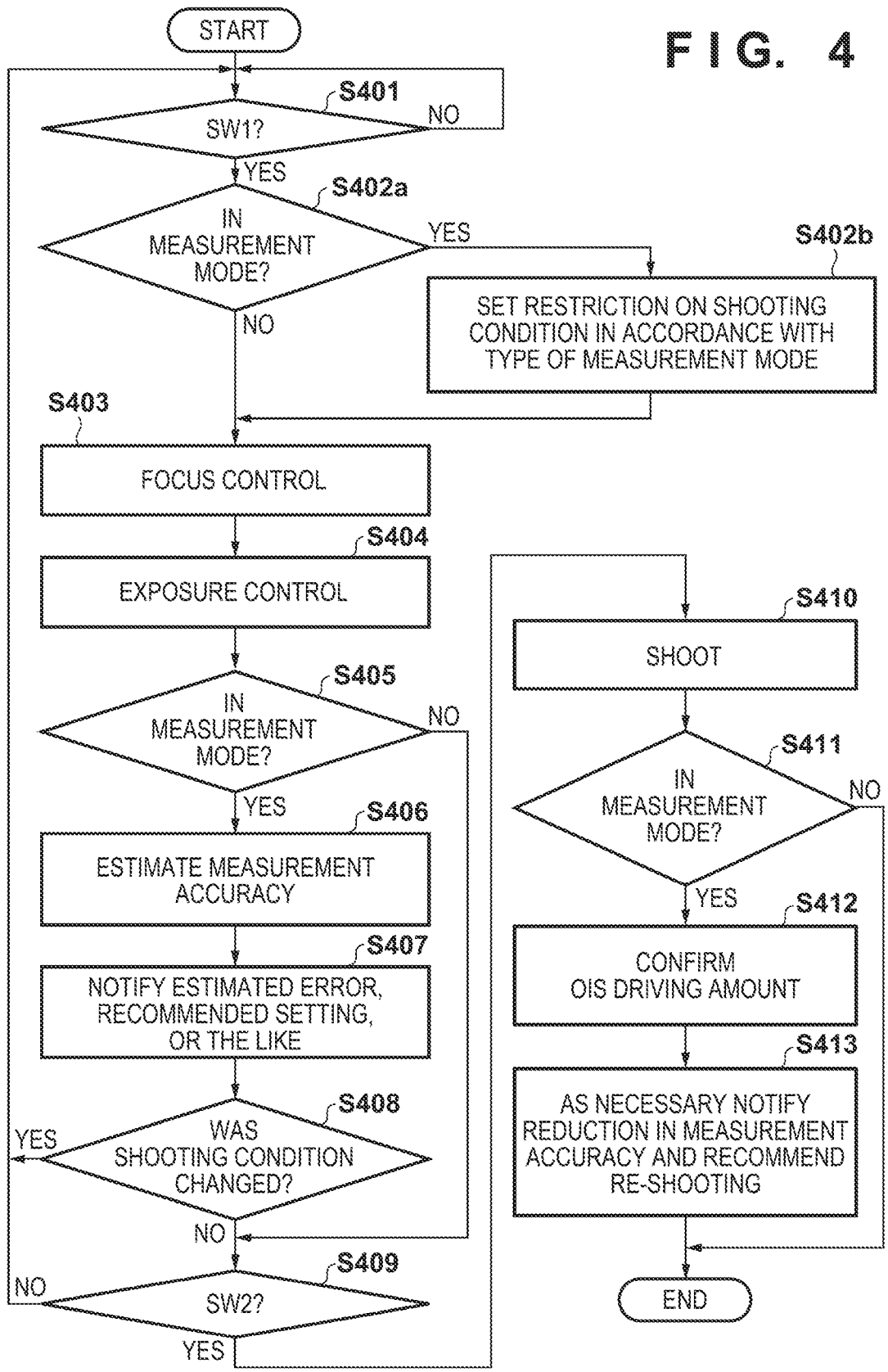
FIG. 4 is a flowchart of shooting processing including determination of a shooting condition appropriate for dimension measurement and notification processing.

With reference to FIG. 4, a description is now given of the flow of shooting processing including determination of a shooting condition appropriate for dimension measurement and notification processing. Processing of each step of FIG. 4 can be realized by the control unit 12 reading out a corresponding processing program stored in, for example, the storage unit 14, deploying the processing program to a non-illustrated volatile memory, and executing the processing program.

In step S401, the control unit 12 determines whether a photographer (user) has performed an operation of depressing a shutter button halfway through. The operation of depressing the shutter button halfway through is denoted as "SW1". The control unit 12 repeats the determination of step S401 until the operation of depressing the shutter button halfway through is performed. Once the operation of depressing the shutter button halfway through has been performed, the processing step proceeds to step S402.

In step S402a, the shooting mode determination unit 120 determines whether the current shooting mode that has been set by the user is a measurement mode. In a case when the current shooting mode is a measurement mode, the processing step proceeds to step S402b, otherwise, the processing step proceeds to step S403.

In step S402b, the shooting mode determination unit 120 determines the type of the measurement mode that has been set. The exposure control unit 122 sets a restriction on a shooting condition in accordance with the type of the measurement mode. There are a plurality of types of measurement modes as shown in Table 1, and shooting parameters to be preferentially set in conformity with the user's intention vary depending on the types of measurement modes. The digital camera 100 is configured in such a manner that at least one of the plurality of types of measurement modes shown in Table 1 can be set.

TABLE 1

| Types of Measurement Modes | Features | Examples of Signs Displayed |
|---|---|---|
| Fully Automatic | Automatically set shooting condition appropriate for measurement | Ms-At |
| Ranging Resolution Priority | Set maximum aperture | Ms-Dr |
| Ranging Depth Priority | Set aperture to the smallest size that enables ranging | Ms-Dp |
| Camera Shake Reduction Priority | Set exposure period to 1/focal length or less | Ms-Is |
| Aperture Priority | Aperture set by user is fixed (restriction is placed on the size of the smallest aperture that enables ranging) | Ms-Av |
| Shutter Speed Priority | Shutter speed set by user is fixed (restriction is placed on the longest exposure period, in consideration of camera shake correction) | Ms-Tv |

A description is now given of the relationship between a shooting condition and a distance resolution for ranging. Regarding a base-line length W based on the image capturing plane phase detection method, the distance between the centers of mass in the light amount distribution of a light beam on the exit pupil is equivalent to a base-line length W in triangulation. The base-line length W, which changes in accordance with the aperture value, is the longest when the maximum aperture is set, and becomes smaller when the aperture is reduced. In a case when the size of the aperture is smaller than a predetermined size, two images cannot be distinguished from each other, and ranging cannot be executed. The aperture value corresponding to the aperture of this smallest size that enables ranging (a limit value) is a value that is dependent on the characteristics of the image capturing optical system and the image sensor, and the method of parallax calculation, for example, F11, an F-number, is set as the limit value.

It is assumed that the aperture value derived in accordance with the base-line length W (the F-number converted based on the base-line length) is F'=f/W. Here, f is a focal length. Provided that the parallax amount on the image plane is r and the focus distance on the image side is s', the defocus amount def on the image side can be derived using Expression 1.

$$def = rs'/(W-r) \quad (1)$$

As the unit of the base-line length W is mm and the unit of the parallax amount r is μm, W>>r holds, and the following is presumed.

$$def \approx rs'/W \quad (2)$$

Here, as the approximation s' ~ f is possible in cases other than macro shooting, the following notation is possible.

$$def \approx rf/W = rF' \quad (3)$$

The distance resolution is dependent on the resolution of detectable defocus, and the defocus resolution is dependent on the aperture value F' that has been derived in accordance with the resolution Δr of parallax r and the base-line length W (the F-number converted based on the base-line length).

$$\Delta def \approx \Delta r F' \quad (4)$$

Therefore, the distance resolution is improved as the size of the aperture increases (as the value of the F-number converted based on the base-line length decreases).

Assume the conversion from the distance resolution Δdef on the image side to the distance resolution Δd on the object side. Provided that the subject distance is s, the distance resolution Δd is represented by the following expression.

$$\Delta d = \Delta rs(s-f)/\{fW + r(s-f)\} \quad (5)$$

Provided that the shooting magnification β=1/m, the above expression 5 can be approximated by the following expression 6 in cases other than macro shooting.

$$\Delta d \approx \Delta r F' m^2 \quad (6)$$

The distance resolution worsens as the shooting magnification decreases, that is to say, as the subject distance increases in a case when the focal length is constant.

Provided that the distance resolution is within a distance error range, calculating an error (%) of dimension measurement with the use of the same enables approximation based on the following expression.

$$\Delta h\ (\%) \approx \pm m\Delta rF'/(f \pm m\Delta rF') \times 100 \quad (7)$$

It is apparent from expression 7 that, provided that the parallax resolution is constant, the error of dimension measurement decreases when the reciprocal m of the shooting magnification is small, the aperture value (F'-number) is small, and the focal length is long. That is to say, the measurement can be performed more accurately as the focal length increases and the subject distance decreases.

Note that the resolution on the object side can be used as an index for the measurement accuracy in place of the shooting distance and the shooting magnification. The resolution R on the object side can be derived based on the following expression with use of the shooting magnification β and the size c of a unit pixel of the pixel unit 110.

$$R = c/\beta \quad (8)$$

As can be understood from expression 8, the resolution R can be obtained by dividing the size of a unit pixel of the image sensor 11 used in shooting by the shooting magnification.

The parallax resolution Δr is dependent on the parallax calculation method, the window size at the time of calculation, and so on. However, when the same parallax calculation method is used, the parallax resolution Δr is dependent on the SNR of images, and, thus, the parallax resolution decreases as the ISO film speed increases. While Δr can be represented as a function of the ISO film speed, it is also possible to perform the error calculation of expression 7 by setting the ISO film speed that satisfies predetermined Δr and assuming the same as a constant value. Although the parallax resolution Δr is dependent on the parallax calculation method and the window size as stated earlier, favorable results are achieved by, for example, shooting at ISO 1600 or less. Note that the measurement can be performed even if the sensitivity is increased to approximately ISO 6400, although it depends on the desired measurement accuracy.

As described above, the focal length and the shooting magnification are also relevant to the error of dimension measurement, and the shooting magnification is decided from the focal length and the subject distance. In the case of the zoom lens, the focal length can also be set as a changeable parameter. Therefore, it is possible to provide a setting for selecting whether to perform shooting with priority on the focal length or perform shooting with priority on the subject distance, separately from the settings of measurement modes shown in Table 1. By setting which one to prioritize, it can be used as an index at the time of notification, which will be described later.

Next, the relationship between a shooting condition and the scope of ranging will be described. When an image used in the calculation of parallax between two images is blurry, it becomes difficult to distinguish between the two images, and the accuracy of parallax calculation decreases. Therefore, the distance range in which ranging can be performed is related to the depth of field of an image. The depth of field is represented by the circle of least confusion δ and the aperture value F on the image side, and the scope of ranging falls within the range ±αFδ. Here, α is a coefficient that is decided using, for example, a parallax calculation method.

Next, the details of each measurement mode will be described. In the case of the fully automatic mode, the exposure control unit 122 automatically sets the settings with which the ranging resolution, the scope of ranging, the shutter speed (exposure period), and the ISO film speed are balanced with respect to the focal length and the subject distance at the time of shooting. In consideration of the ranging resolution and the scope of ranging, for example, the aperture value is set to approximately F4, the ISO film speed is set to approximately 400, and ultimately the shutter speed is set so as to achieve appropriate exposure. The limit of the shutter speed on the low-speed side is set to, for example, a speed obtained by adding the number of stops of correction provided by the image stabilization functions to (1/focal length). In a case when the shutter speed is longer than the set limit value, the exposure control unit 122 makes an adjustment by increasing the setting of the ISO film speed to 1600 to achieve appropriate exposure. In the case of even lower exposure, the exposure control unit 122 adjusts the aperture value when the aperture value can be set to F4 or less. Note that, although there may be a case when the accuracy of ranging does not satisfy the desired accuracy depending on the focal length, the subject distance, and the amount of environmental light, the exposure control unit 122 adopts optimal settings under such restricted conditions.

The ranging resolution priority mode is a mode in which the ranging resolution is minimized with respect to the focal length and the subject distance at the time of shooting. The exposure control unit 122 sets the maximum aperture and sets the ISO film speed to low sensitivity, and ultimately decides the shutter speed. More specifically, for example, the ISO film speed is set to approximately 100 and is restricted to a range that does not exceed 400. The exposure control unit 122 decides the shutter speed so as to satisfy this condition and to achieve appropriate exposure in accordance with the amount of environmental light.

The ranging depth priority mode is a mode that maximizes the range in which ranging can be performed with respect to the focal length and the subject distance at the time of shooting. The exposure control unit 122 sets the aperture to the smallest aperture value that enables ranging. Because F11 is generally the limit value as stated earlier, the exposure control unit 122 sets the aperture between F8 and F11, for example. Next, the exposure control unit 122 decides the ISO film speed and the shutter speed so that shooting can be performed under optimal exposure. Note that the respective setting values are decided within the range of the highest ISO film speed appropriate for ranging and the lowest shutter speed appropriate for ranging.

In the case of the camera shake reduction priority mode, the exposure control unit 122 sets the shutter speed so that the effects of a camera shake do not occur even if optical image stabilization is not used with respect to the focal length and the subject distance at the time of shooting. For example, the shutter speed is set to achieve an exposure period shorter than (1/focal length). Next, the exposure control unit 122 decides the aperture value and the ISO film speed so that shooting can be performed under optimal exposure. The respective setting values are decided within the range of the largest F-number appropriate for ranging and the highest ISO film speed appropriate for ranging.

In the case of the aperture priority mode, the exposure control unit 122 fixes the aperture value set by the user with respect to the focal length and the subject distance at the time of shooting, and subsequently decides the ISO film speed and the shutter speed so that shooting can be performed under optimal exposure. Note that the respective setting values are decided within the range of the highest ISO film speed appropriate for ranging and the lowest shutter speed appropriate for ranging.

In the case of the shutter speed priority mode, the exposure control unit 122 fixes the shutter speed set by the user with respect to the focal length and the subject distance at the time of shooting, and subsequently decides the aperture value and the ISO film speed so that shooting can be performed under optimal exposure. Note that the respective setting values are decided within the range of the largest F-number appropriate for ranging and the highest ISO film speed appropriate for ranging.

In step S403, the focus control unit 121 executes a focus operation. The focus control unit 121 executes an operation of focusing on a subject to be shot with the use of an autofocus (AF) function or a manual focus (MF) function. With the AF function, the focus control unit 121 performs control so that the target subject is optimally focused based on the phase detection method and the contrast method by driving the focusing lens, which is a part of the image capturing optical system 10. Also, the focus control unit 121 estimates the subject distance based on position information of the focusing lens and design information of the image capturing optical system 10.

In step S404, the exposure control unit 122 fixes the shooting parameter to be prioritized in accordance with the restriction on the shooting condition set in step S402b (that is to say, in accordance with the type of the measurement mode), and then sets other shooting parameters so as to achieve optimal exposure. The detailed control procedure for shooting parameters is as described with respect to various types of measurement modes in step S402b. Note that, in a case when the shooting mode is the normal shooting mode, there is no restriction on the shooting condition corresponding to the type of the measurement mode, and, thus, the exposure control unit 122 sets shooting parameters without being subject to such a restriction.

In step S405, the shooting mode determination unit 120 determines whether the current shooting mode that has been set by the user is a measurement mode. In a case when the current shooting mode is a measurement mode, the processing step proceeds to step S406. Otherwise, the processing step proceeds to step S409.

In step S406, the measurement accuracy estimation unit 123 estimates the measurement accuracy. Specifically, the measurement accuracy estimation unit 123 estimates the measurement accuracy (the error of dimension measurement) in accordance with expression 7 with the use of the shooting parameters that have been set through processing thus far, the estimated subject distance, and the set focal length. In a case when the measurement accuracy does not satisfy a required threshold (a predetermined criterion), the measurement accuracy estimation unit 123 selects parameters that can be changed in accordance with the type of the measurement mode, and determines whether there are settings with which the measurement accuracy satisfies the threshold if these parameters are changed. In a case when there are settings with which the measurement accuracy satisfies the threshold, the measurement accuracy estimation unit 123 changes shooting parameters to the settings with which the measurement accuracy satisfies the threshold. In a case when there are no settings with which the measurement accuracy satisfies the threshold, the measurement accuracy estimation unit 123 calculates setting values of respective shooting parameters that are recommended in a case when the type of the measurement mode is changed.

Here, although individual settings, such as the aperture value, ISO film speed, and shutter speed, are set so as to achieve optimal exposure within the range of limit values appropriate for measurement, final confirmation on the measurement accuracy and adjustment of setting values are necessary. In a case when setting values of respective parameters within the range of limit values are used, the optimal exposure condition may not be achieved, and, thus, the measurement accuracy estimation unit 123 also determines whether the optimal exposure condition is satisfied. Note that it is permissible to adopt a configuration in which whether to prioritize settings for optimal exposure as an image to be viewed or to prioritize settings for dimension measurement can be selected in a separate setting, and recommended values are calculated in accordance with such settings.

Also, after deciding the aperture value, ISO film speed, and shutter speed that are optimal for measurement, the measurement accuracy estimation unit 123 calculates a combination of the focal length and the subject distance with which the measurement accuracy satisfies the threshold. The measurement accuracy estimation unit 123 executes the calculation with regard to two cases: a case when the focal length is fixed, and a case when the subject distance is fixed. That is to say, the measurement accuracy estimation unit 123 calculates the extent of subject distances that satisfy the accuracy with respect to the focal length set by the user, and the number of focal lengths with which the measurement accuracy satisfies the threshold in a case when the subject distance is fixed.

In step S407, the notification control unit 124 notifies the user of the estimate value of the measurement accuracy (the error of dimension measurement) obtained in step S406, information indicating whether the error is less than the threshold, shooting parameters that have been set, recommended shooting parameters, the focal length, the subject distance, the shooting magnification, and the like. This notification is performed by, for example, displaying necessary information on the display unit 16. For example, in a case when the accuracy of dimension measurement does not satisfy the predetermined criterion, the notification control unit 124 provides a notification indicating that the accuracy of dimension measurement does not satisfy the predetermined criterion. A case when the accuracy of dimension measurement does not satisfy the predetermined criterion is, for example, a case when the error is larger than the threshold. Other than these, the notification control unit 124 provides a notification of information related to the error and accuracy and information on the settings, recommendations, and changes related to the shooting condition, such as limit values of shooting parameters that can be set at the time of measurement, and a notification about whether to change to recommended shooting parameters.

In a case when the desired measurement accuracy is not achieved due to the focal length and the subject distance, the notification control unit 124 provides a notification of a change in the focal length and a change in the subject distance in accordance with the aforementioned setting related to whether to prioritize the focal length or to prioritize the subject distance. In the case when the focal length is prioritized (fixed), the notification control unit 124 calculates the subject distance that realizes a shooting magnification with which the desired measurement accuracy is achieved in accordance with the focal length that was set at the time of shooting, and provides a notification of the same. In this case, the user changes the distance to the subject so as to achieve the desired shooting magnification, and executes shooting. In the case when the subject distance is prioritized (fixed), the notification control unit 124 automatically sets, or provides a notification of, the focal length so as to realize a shooting magnification with which the desired measurement accuracy is achieved in accordance with the subject distance at the time of shooting. In a case when there is no focal length that satisfies the shooting magnification, the notification control unit 124 provides a notification to that effect, and provides a notification of the recommended subject distance at the same time.

FIGS. 5A and 5B show examples of user interfaces. FIG. 5A shows a user interface for the case of settings that prioritize the focal length. FIG. 5B shows a user interface for the case of settings that prioritize the subject distance. The user interfaces of FIG. 5A and FIG. 5B display the restrictions that are necessary for the accuracy of dimension measurement to satisfy the predetermined criterion (e.g., the lowest shutter speed indicated by reference sign 503a, which will be described later, and the like).

In FIG. 5A and FIG. 5B, 500 is a display provided in the display unit 16, and displays a shot image obtained by the image sensor 11 at the time of shooting. 501 is a region that displays a sign indicating the type of the measurement mode at the time of shooting, and displays a sign corresponding to the measurement mode, like those exemplarily shown in Table 1. 502 is a region that displays the shooting magnification or the reciprocal of the shooting magnification. The shooting magnification or the reciprocal of the shooting magnification is displayed in an enhanced manner by, for example, changing the color of displayed characters, so as to enable the user to recognize whether the desired measurement accuracy is achieved by the shooting magnification. 503a indicates the lowest shutter speed that can be set with the current measurement mode. 503b is a region that displays the shutter speed at the time of shooting. 504a indicates the largest aperture value (F-number) that can be set with the current measurement mode. 504b is a region that displays the aperture value at the time of shooting. 505 indicates the extent of exposure under the current shooting condition in relation to appropriate exposure. 506a indicates the highest ISO film speed that can be set with the current measurement mode. 506b is a region that displays the ISO film speed at the time of shooting. In some cases, the shutter speed, aperture value, and ISO film speed have fixed values depending on the types of measurement modes. In these cases, the display color is changed in displaying the fixed setting values so as to indicate that they are fixed values.

In FIG. 5A, 507a is subject distance information that is displayed in a case when it is necessary to change the subject distance so that the measurement accuracy satisfies the threshold under the settings that prioritize the focal length. 507b indicates the current subject distance, and 507c is the subject distance that is recommended in order for the measurement accuracy to satisfy the threshold. In order for the measurement accuracy to satisfy the threshold under the current shooting condition, the user needs to move so as to achieve the subject distance indicated by the 507c.

In FIG. 5B, 508a is focal length information. The focal length information is displayed in a case when it is necessary to change the focal length so that the measurement accuracy satisfies the threshold in a situation where a shooting lens with a variable focal length is used and the settings that prioritize the subject distance have been set. 508b indicates the current focal length, and 508c is the focal length that is recommended in order for the measurement accuracy to satisfy the threshold. In order for the measurement accuracy to satisfy the threshold under the current shooting condition, the user needs to change the focal length of the shooting lens so as to achieve the focal length indicated by 508c. In a case when the measurement accuracy does not satisfy the threshold within the range of changeable focal lengths with the subject distance at the time of shooting, the notification control unit 124 provides a notification of non-existence of the settings with which the measurement accuracy satisfies the threshold and information for recommending a change in the subject distance.

Also, in a case when the measurement accuracy does not satisfy the threshold, the notification control unit 124 may display, on the user interfaces shown in FIG. 5A and FIG. 5B, warning displays indicated by reference signs 601 to 605 in FIG. 6A, in addition to the numerical values displayed. Note that the expected value of the measurement accuracy (measurement error) may be displayed by displaying a warning display indicated by 604 as a pop-up, or may be always displayed on the user interfaces shown in FIG. 5A and FIG. 5B.

In step S408, the control unit 12 determines whether the user has changed the shooting condition via the input unit 15. In a case when the shooting condition has not been changed, the processing step proceeds to step S409. In a case when the shooting condition has changed, the control unit 12 changes the shooting condition in accordance with a user's instruction, and the processing step returns to step S401.

In step S409, the control unit 12 determines whether the user has performed an operation of fully depressing the shutter button. The operation of fully depressing the shutter button is denoted as "SW2". In a case when the operation of fully depressing the shutter button has been performed, the processing step proceeds to step S410. Otherwise, the processing step returns to step S401.

In step S410, the control unit 12 performs various types of control operations, and executes a sequence of shooting control including exposure, readout, and so on. Based on the shot image that has been read out from the image sensor 11, the image processing unit 13 generates an image to be viewed and generates a depth image.

The generation of the image to be viewed is executed in the image generation unit 130. The image generation unit 130 generates one Bayer-array image by adding up the pixel values of respective pixels in the A image signal and the B image signal, and performs demosaicing processing for images that are respectively in colors R, G, and B with respect to the generated Bayer-array image, thereby generating the image to be viewed. In addition, processing such as noise removal or reduction, luminance signal conversion, aberration correction, white balance adjustment, and color correction is executed, and data of the generated image to be viewed is stored into the memory 133.

The generation of the depth image is executed in the depth generation unit 131. First, the depth generation unit 131 executes light amount correction processing with respect to the A image signal and the B image signal to correct the light amount balance between the two images. Thereafter, the depth generation unit 131 executes band restriction with the use of a band-pass filter in order to remove components with low SNR. Thereafter, the depth generation unit 131 derives the parallax amount in respective pixels between two images with use of correlation calculation. A method such as NCC, SSD, and SAD is used as a method of deriving a correlation degree. NCC is an acronym for "Normalized Cross-Correlation". SSD is an acronym for "Sum of Squared Difference", and SAD is an acronym for "Sum of Absolute Difference". The calculated parallax amount (denoted as d) is converted into a defocus amount by using a predetermined conversion coefficient. The defocus amount is equivalent to the distance from the image sensor 11 to a focus point of the image capturing optical system 10. Here, the predetermined conversion coefficient is denoted as K, and the defocus amount is denoted as $\Delta L$. The parallax amount d is converted into the defocus amount $\Delta L$ with use of the following expression 9.

$$\Delta L = K \times d \tag{9}$$

Furthermore, the defocus amount $\Delta L$ can be converted into the subject distance with use of a lens formula related to geometric optics, which is indicated by the following expression 10.

$$1/A + 1/B = 1/F \tag{10}$$

In expression 10, A denotes the distance from an object plane to the principal point of the image capturing optical system 10 (the subject distance), B denotes the distance from the principal point of the image capturing optical system 10 to the image plane, and F denotes the focal length of the image capturing optical system 10. In expression 10, as the value of B can be derived from the defocus amount $\Delta L$, the distance A can be derived based on the setting of the focal length F at the time of image capture. The depth generation unit 131 generates two-dimensional information in which the derived subject distance is represented by pixel values, and stores data of the depth image based on the two-dimensional information into the memory 133.

In step S411, the shooting mode determination unit 120 determines whether the current shooting mode that has been set by the user is a measurement mode. In a case when the current shooting mode is a measurement mode, the processing step proceeds to step S412. Otherwise, processing of the present flowchart ends. The determination processing of step S411 and processing thereafter can be executed in parallel during the readout of the shot image from the image sensor 11 and the execution of image processing.

In step S412, the optical image stabilization driving amount confirmation unit 125 obtains data that has recorded therein how an optical image stabilization unit has been driven during exposure in a case when optical image stabilization has been executed at the time of shooting. Especially, the optical image stabilization driving amount confirmation unit 125 obtains information of an average driving position during exposure. The optical image stabilization driving amount confirmation unit 125 holds, in advance, information indicating how the field curvature changes depending on the driving position of the optical image stabilization unit based on design values of the image capturing optical system 10, and calculates a field curvature amount corresponding to the obtained average driving position. Here, although ranging error correction related to the field curvature can be carried out when a distance image is generated based on the calculated field curvature amount, there are cases when the advantageous effects of the correction cannot be sufficiently attained, such as a case when the field curvature amount is greater than a predetermined amount. Therefore, the optical image stabilization driving amount confirmation unit 125 sets a limit driving amount in accordance with the image capturing optical system 10 and a desired measurement error amount, and determines that the measurement error becomes great when driving of the optical image stabilization unit exceeds that driving amount.

In step S413, in a case when the driving amount of the image stabilization optical system is great and the influence on the measurement accuracy cannot be ignored based on the result obtained in step S412, the notification control unit 124 notifies the photographer of a reduction in the measurement accuracy and recommendation for re-shooting. FIG. 6B shows one example of a notification in step S413. The notification of step S413 is a warning displayed on the user interface shown in FIG. 5A or FIG. 5B. No limitation is intended by the notification in the form of a displayed warning. For example, the image user can also be notified by adding a warning to the shot image as meta information.

As described above, according to the first embodiment, the digital camera 100 estimates the accuracy of dimension measurement, which is performed using a plurality of parallax images, based on the shooting condition. Also, the digital camera 100 provides a notification based on the estimated accuracy.

The timing at which the digital camera 100 estimates the accuracy and provides a notification based on the estimated accuracy may be before shooting of the plurality of parallax images, or may be after the shooting. In a case the estimation of the accuracy and the provision of the notification based on the estimated accuracy are performed before the shooting, the user can know, in advance, whether the accuracy of the dimension measurement satisfies the predetermined criterion if the shooting is performed under the current shooting condition. Also, a recommended shooting condition with which the accuracy of dimension measurement satisfies the predetermined criterion (the content of a change in the shooting condition that is necessary for the accuracy to satisfy the predetermined criterion) can be searched for before the shooting, while reflecting the intentions of the user. Furthermore, the digital camera 100 can provide a notification of the recommended shooting condition (the content of the change in the shooting condition that is necessary for the accuracy to satisfy the predetermined criterion) in the forms indicated by reference signs 601 to 603 and 605 in FIG. 6A.

In a case the estimation of the accuracy and the provision of the notification based on the estimated accuracy are performed after the shooting, the user can know whether the shooting has been performed under the shooting condition that is necessary for the accuracy of dimension measurement to satisfy a predetermined condition, even after the shooting. Also, in this case, an apparatus that is different from the digital camera 100 (e.g., a personal computer) may estimate the accuracy and provide a notification based on the estimated accuracy. For example, the personal computer can obtain a shooting condition corresponding to a plurality of parallax images that have been shot, and determine, based on the obtained shooting condition, whether the accuracy of dimension measurement satisfies the predetermined criterion. Thereafter, the personal computer can notify the user of the estimation result.

The notification content includes the measurement accuracy, the shooting condition that needs to be changed (the content of a change in the shooting condition), an optimal shooting condition, the result of determining whether the measurement can be performed with the accuracy that satisfies the predetermined criterion, and so on. Also, as a notification method, it is possible to adopt a method in which the notification content is displayed on a display screen of the computer, or a method in which the notification content is added to meta information of images. Alternatively, as a notification method, it is possible to adopt a method in which images are classified into different folders depending on the measurement accuracy, the shooting condition, or whether the measurement can be performed with the accuracy that satisfies the predetermined criterion.

Here, the notification of the shooting condition is not always limited to being provided to the user, and may be provided to a shooting system or a dimension measurement application.

Note that, although the present embodiment has been described in relation to a method based on the image capturing plane phase detection method as an example of dimension measurement, dimension measurement of the present embodiment is not limited to this method. For example, it is possible to adopt a method in which a dimension is derived by obtaining the length and the area of a measurement target object on an image with use of an image recognition technique, such as machine learning, and converting them into the length and the area on the object side based on the aforementioned distance information, shooting magnification, and resolution information. Alternatively, it is possible to adopt a method that finds out whether an image shows a target object of a predetermined length and area based on the aforementioned distance information, shooting magnification, and resolution information. In such a measurement, too, the accuracy changes depending on the noise and blurring included in an image, the resolution, and the like. By estimating whether the measurement can be performed with the desired measurement accuracy (the accuracy that satisfies the predetermined criterion) based on the shooting condition, and by notifying the user in the above-described manner, the user can be notified of whether the measurement can be performed with the desired measurement accuracy.

Second Embodiment

The first embodiment has been descried in relation to a configuration in which, regarding the adjustment of the shooting magnification that is intended for the accuracy of dimension measurement to satisfy the threshold, the adjustment of the shooting magnification is assisted by displaying information related to the items of the focal length or the subject distance that is not prioritized, in accordance which of the items of the focal length and the items of the subject distance are to be prioritized. In contrast, a second embodiment will be described in relation to a user interface that allows a user to execute the adjustment of the shooting magnification without configuring settings that prioritize the focal length or the subject distance.

Note that, in the present embodiment, the fundamental configuration of the digital camera 100 is the same as that of the first embodiment. The following mainly describes the differences from the first embodiment.

Figure 7:
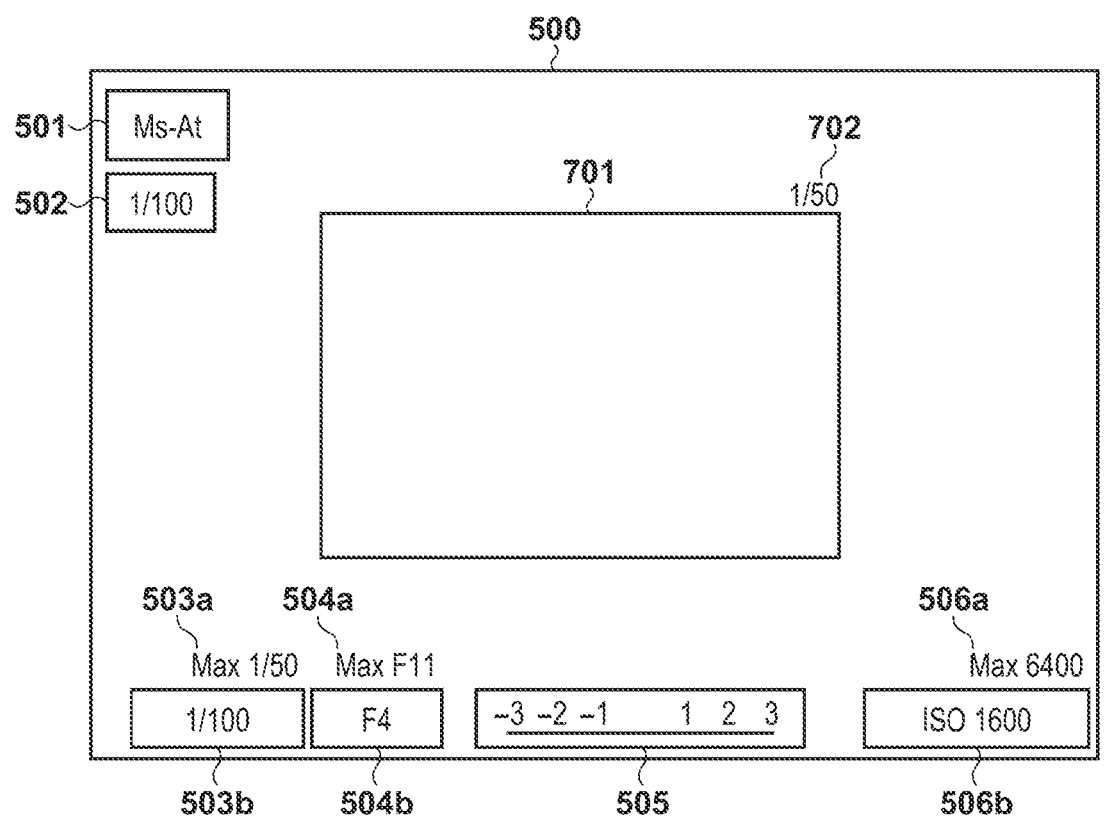
FIG. 7 is a diagram showing a user interface according to a second embodiment.

FIG. 7 is a diagram showing a user interface according to the second embodiment. The user interface of FIG. 7 is a user interface that is intended to assist a user in adjusting the shooting magnification so that the shooting magnification does not become equal to or less than the lowest shooting magnification for performing the measurement with the accuracy of dimension measurement that has been set.

A region on the object side that is obtained by the digital camera 100 is decided in accordance with the size of the image sensor 11 and the shooting magnification. Therefore, a rectangular region in the XY directions at a distance Z that satisfies the smallest shooting magnification is decided in accordance with the size of the image sensor 11. The control unit 12 displays this rectangular region as a rectangular region 701 superimposed on the user interface. That is to say, the control unit 12 displays information indicating a shooting region corresponding to the lowest shooting magnification within a shooting region corresponding to the current shooting magnification. 702 indicates the lowest shooting magnification. In the shooting status of FIG. 7, the current shooting magnification displayed in the region 502 is $\frac{1}{100}$, which is a value less than $\frac{1}{50}$, which is the lowest shooting magnification. Provided that the size of the image sensor is 36 mm×24 mm, a rectangular region of 1800 mm×1200 mm is shot with the lowest shooting magnification. In a case when the shooting magnification is $\frac{1}{100}$, the region of the screen 500 in FIG. 7 corresponds to a region of 3600 mm×2400 mm. Therefore, in a case when the current shooting magnification is less than the smallest shooting magnification, the rectangular region 701 is less than the screen 500, and, thus, the rectangular region 701 is displayed on the screen 500. On the other hand, in a case when the current shooting magnification is equal to or greater than the lowest shooting magnification, the size of the rectangular region 701 is equal to or greater than the size of the screen 500, and, thus, the rectangular region 701 is not displayed.

Therefore, the user can adjust the shooting magnification to the lowest shooting magnification or greater by adjusting the focal length and the subject distance so that the rectangular region 701 is not displayed. Also, in a case when the shooting magnification is equal to or greater than the lowest shooting magnification, the control unit 12 may provide the user with a notification indicating that the condition for the shooting magnification has been satisfied by, for example, changing the display color of the shooting magnification in the region 502.

As described above, according to the second embodiment, in a case when the current shooting magnification is less than the smallest shooting magnification (the lowest shooting magnification that satisfies the required accuracy of dimension measurement), the digital camera 100 displays the rectangular region 701, which indicates the region to be shot with the lowest shooting magnification, on the screen 500. In this way, the user can set the shooting magnification to the lowest shooting magnification or larger by performing an intuitive operation of adjusting the focal length or the subject distance so that the rectangular region 701 becomes equal to or greater than the screen 500 in size and is not displayed, without taking into consideration the specific values of the focal length and the subject distance.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An accuracy estimation apparatus comprising:
at least one processor and/or at least one circuit that functions as:
an obtainment unit configured to obtain a shooting condition for a plurality of parallax images that mutually exhibit parallax;
an estimation unit configured, based on the shooting condition, to estimate an accuracy of a dimension measurement that is performed using the plurality of parallax images; and
a notification unit configured to provide a notification based on the accuracy, wherein, in a case when (i) a current shooting mode is a measurement mode among a normal shooting mode and the measurement mode and (ii) the accuracy does not satisfy a predetermined criterion, the notification unit provides a notification indicating that the accuracy does not satisfy the predetermined criterion.

2. The accuracy estimation apparatus according to claim 1, wherein the shooting condition includes at least one of a sensitivity, an aperture value, an exposure period, a focal length, a subject distance, and a driving amount of an optical image stabilization unit.

3. The accuracy estimation apparatus according to claim 1, wherein the shooting condition includes a resolution of the plurality of parallax images.

4. The accuracy estimation apparatus according to claim 3, wherein the obtainment unit obtains the resolution by dividing a size of a unit pixel in an image sensor that has been used in shooting of the plurality of parallax images by a shooting magnification of the plurality of parallax images.

5. The accuracy estimation apparatus according to claim 1, wherein the notification unit provides a notification of information indicating the accuracy.

6. The accuracy estimation apparatus according to claim 1, wherein the at least one processor and/or the at least one circuit further functions as a determination unit configured, in a case when the accuracy does not satisfy a predetermined criterion, to determine a content of a change in the shooting condition that is necessary for the accuracy of the dimension measurement to satisfy the predetermined criterion, and wherein, in a case when the accuracy does not satisfy the predetermined criterion, the notification unit provides a notification of the content of the change in the shooting condition.

7. An accuracy estimation method executed by an accuracy estimation apparatus, the method comprising:
   obtaining a shooting condition for a plurality of parallax images that mutually exhibit parallax;
   based on the shooting condition, estimating an accuracy of a dimension measurement that is performed using the plurality of parallax images; and
   providing a notification based on the accuracy, wherein, in a case when (i) a current shooting mode is a measurement mode among a normal shooting mode and the measurement mode and (ii) the accuracy does not satisfy a predetermined criterion, the notification provides a notification indicating that the accuracy does not satisfy the predetermined criterion.

8. A non-transitory computer-readable storage medium that stores a program for causing a computer to execute an accuracy estimation method comprising:
   obtaining a shooting condition for a plurality of parallax images that mutually exhibit parallax;
   based on the shooting condition, estimating an accuracy of dimension measurement that is performed using the plurality of parallax images; and
   providing a notification based on the accuracy, wherein, in a case when (i) a current shooting mode is a measurement mode among a normal shooting mode and the measurement mode and (ii) the accuracy does not satisfy a predetermined criterion, the notification provides a notification indicating that the accuracy does not satisfy the predetermined criterion.

* * * * *